A. E. ALLES.
EYE SHADE.
APPLICATION FILED JULY 22, 1909.
950,255.
Patented Feb. 22, 1910.
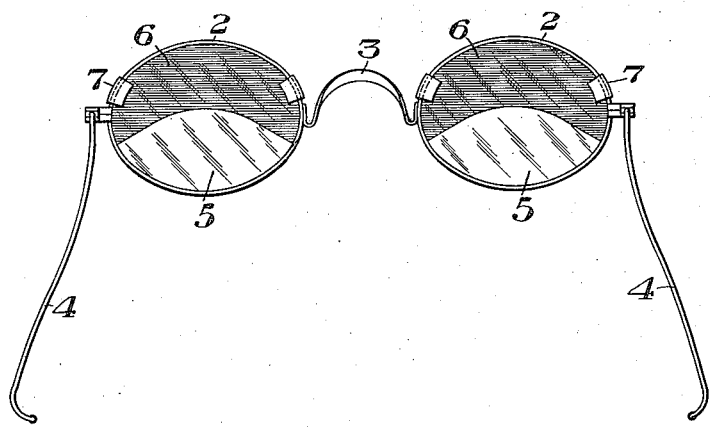
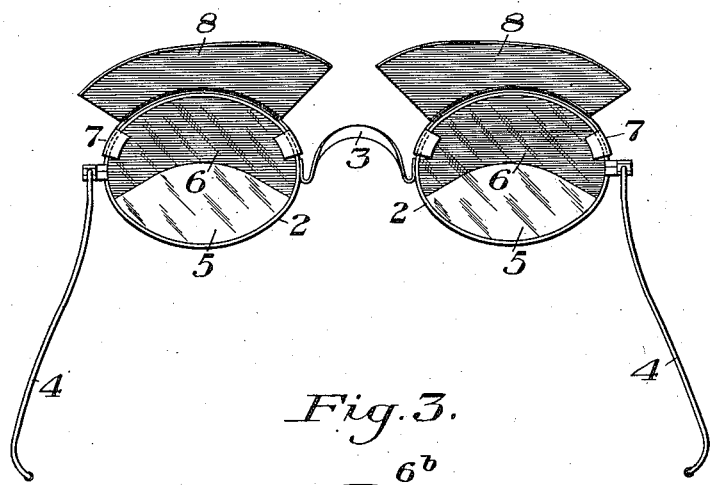
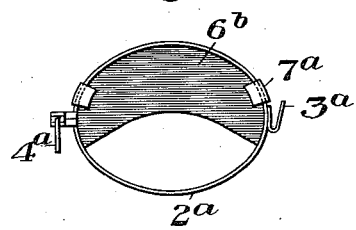
WITNESSES
INVENTOR
A. E. Alles,

UNITED STATES PATENT OFFICE.

AUGUST E. ALLES, OF CHARLEROI, PENNSYLVANIA.

EYE-SHADE.

950,255.

Specification of Letters Patent. Patented Feb. 22, 1910.

Application filed July 22, 1909. Serial No. 509,020.

*To all whom it may concern:*

Be it known that I, AUGUST E. ALLES, of Charleroi, county of Washington, and State of Pennsylvania, have invented a new and useful Improvement in Eye-Shades, of which the following is a full, clear, and exact description, reference being had to the accompanying drawings, in which—

Figure 1 is an elevation showing a pair of spectacles provided with my improved shades. Fig. 2 is a similar view showing another form, and Fig. 3 is a detail view showing an eye glass rim with shade.

My invention is designed to protect the eyes, especially for workmen whose eyes are subjected to strong light, as in metal and glass working; though the invention may be used by any one.

The invention is designed to do away with the ordinary eye shade which rests on the forehead and provide individual shades for each eye, which are unobtrusive, neat and easily applied and removed.

In the drawings referring to the form of Fig. 1, I show a pair of spectacles or eye glasses having the usual glass frames 2, 2, nose piece 3 and the bows 4, 4. In this form the eye glass frames are provided with glasses 5 which may be of any desirable type. 6, 6 are removable shades which may be slipped on and off from the frames and which cover the upper portions of the glasses. I have shown these shades as provided with clips 7 which engage the rims or frames and hold the shades in place, though any desirable attachment may be employed for holding them removably on the frames. The shades may be made of celluloid, glass or other material and are colored to shade the eyes from the light.

In Fig. 2, I show a form similar to that of Fig. 1, except that the shades are provided with upward extending shields or protectors 8. These shields project above the rims and are designed to protect the eyes from full light rays entering from above. In this figure parts similar to those of Fig. 1 are designated by the same numeral with the letter $a$ applied.

In Fig. 3 I show another form wherein the eye glass rim has no glass or lens, but merely contains the shade $6^b$, which covers the upper portion of the space inclosed by the rim. This shape may be either detachable or permanently secured in its place. The device may be, of course, applied either to eye glasses or spectacles.

The advantages of my invention result from the effective protection given to the eyes without the use of the hot and objectionable ordinary shade.

Changes may be made in the material of the shade as well as in its form, shape and means for attaching without departing from my invention.

By the word "eye glass" in the claims, I intend, of course, to cover either eye glasses, spectacles or any similar meaning.

I claim:—

1. A pair of eye-glasses or spectacles, having translucent shades detachably secured thereto, each of said shades covering the upper portion of one of the lenses and leaving exposed the lower portion of the same, substantially as described.

2. A shade for eye-glass or spectacle lenses, comprising a piece of translucent material of less area than the area of the lenses and having clips for detachably securing it in position over a portion of a lens, substantially as described.

3. A shade for eye-glass or spectacle lenses, comprising a piece of translucent material adapted to fit over a portion of a lens and having a shield portion to project upwardly above the lens, substantially as described.

4. An eye shade, comprising a piece of translucent material having clips for detachably securing it to the frame of eye glasses or spectacles, said piece being of less area than the area of the eye opening through said frame; substantially as described.

In testimony whereof, I have hereunto set my hand.

AUGUST E. ALLES.

Witnesses:
EARLE CREADY,
THS. MORINO.